United States Patent
Hofstetter et al.

(10) Patent No.: US 6,203,305 B1
(45) Date of Patent: Mar. 20, 2001

(54) HOT RUNNER COINJECTION DISTRIBUTOR BLOCK ARRANGEMENT

(75) Inventors: Otto Hofstetter; Luis Fernandez, both of Uznach (CH)

(73) Assignee: Otto Hofstetter AG, Werzeug-und Formenbau, Uznach (CH)

( * ) Notice: Subject to any disclaimer, the term of this patent is extended or adjusted under 35 U.S.C. 154(b) by 0 days.

(21) Appl. No.: 09/180,486

(22) PCT Filed: Jun. 12, 1997

(86) PCT No.: PCT/CH97/00233

§ 371 Date: Nov. 12, 1998

§ 102(e) Date: Nov. 12, 1998

(87) PCT Pub. No.: WO97/47458

PCT Pub. Date: Dec. 18, 1997

(30) Foreign Application Priority Data

Jun. 12, 1996 (CH) .................................... 1474/96

(51) Int. Cl.[7] .................................... B29C 45/16
(52) U.S. Cl. ..................... 425/130; 425/562; 425/564
(58) Field of Search .................... 425/130, 562, 425/564, 566

(56) References Cited

U.S. PATENT DOCUMENTS

| | | |
|---|---|---|
| 4,043,726 * | 8/1977 | Tsunemoto et al. . |
| 4,588,367 * | 5/1986 | Schad . |
| 5,094,603 * | 3/1992 | Gellert .................................... 425/130 |
| 5,200,207 * | 4/1993 | Aksulrud et al. ..................... 425/130 |
| 5,891,381 * | 4/1999 | Bemis et al. .......................... 425/130 |
| 5,894,023 * | 4/1999 | Schramm et al. ..................... 425/130 |

FOREIGN PATENT DOCUMENTS

| | | |
|---|---|---|
| 2035159 * | 7/1969 | (DE) . |
| 8709724 * | 9/1987 | (DE) . |
| 480223 * | 4/1992 | (EP) . |

* cited by examiner

*Primary Examiner*—Tim Heitbrink
(74) *Attorney, Agent, or Firm*—Nath & Associates PLLC; Gary M. Nath; Harold L. Novick

(57) ABSTRACT

The hot-runner coinjection distributor block arrangement comprises several block parts (6, 7) which with the help of heating elements (8) may be brought to differing temperatures. These block parts (6, 7) are spaced from one another with an intermediate piece (9) and are supported via a support element (10) on the head plate (2). In this support element (10) spring elements, preferably a disc spring (11) is incorporated, which spaces the support element (10) from the head plate (2) and press the two block parts (6, 7) onto one another also in the cold mode. In the hot mode these disc springs (11) permit an axial expansion of the block parts (6, 7) and reduce the tension force exerted onto the support element (10). Peg-like formations of the intermediate piece (9) and of the support element (10) ensure that the bores for the guiding of the closure needle or of the feed channel (13) by the thermal expansion of the block parts (6, 7) are retained, i.e. are not laterally displaced.

11 Claims, 1 Drawing Sheet

HOT RUNNER COINJECTION DISTRIBUTOR BLOCK ARRANGEMENT

FIELD OF THE INVENTION

The present invention relates to a hot-runner coinjection distributor block arrangement of several block parts for a hot-runner plate of a multiple hot-runner coinjection tool for injection moulding multi-layered mouldings of plastic.

Such multiple hot-runner coinjection tools for injection moulding mouldings of plastic materials have been known for a long time and are applied essentially with the manufacture of premouldings, as are required by the drinks industry for their so-called PET bottles in large quantities. Increasingly there exists the requirement to design these premouldings multi-layered, in order for example to provide these with recycled material or air impermeable blocking layers. At the same time unusually high demands are made on the mould tools, since with the processing of PET, PEN and their copolymers, as well nylon, EVON or similar blocking layer material, their differing temperature and transport behaviour must be taken into account independently of one another.

The high demands on the controllable temperature guidance in hot and pressure loaded tool parts has led to more complicated tools which are expensive, are prone to damage and are expensive to maintain.

DESCRIPTION OF THE PRIOR ART

Therefore for example a simple design has been suggested in EP-0'480'223 with which instead of a one-piece hot-runner distributor block with separate feed channels, there are applied two hot-runner distributor blocks arranged behind one another which in each case carry one of the plastic components. With this, the various materials, also with a different temperature, may be fed to the nozzles in a simple manner. Between these hot-runner distributor blocks separated from one another there are applied disc-like muffs through which plastic material and a nozzle closure needle are passed and which permit a mutual lateral displacement of the two distributor blocks in this region, inasmuch as this displacement is created by a differing temperature expansion of the individual hot-runner distributor blocks. Furthermore, between the hot-runner distributor block on the head plate side and the head plate, further muffs are provided through which the respective nozzle closure needles project and which occlude a centrally arranged feed channel in a pressure tight manner. These muffs space the block on the head plate side and the head plate in order to separate these thermally from one another and are to accommodate the axial pressure caused by the temperature expansion.

Unfortunately it has been shown that the provided means for compensating the differing temperature expansion of the two hot-runner distributor blocks do not meet the mechanical demands with multiple tools with more than 8 nozzles, in particular with 48 or 96 nozzles. With these highly equipped multiple tools the tension force produced by the thermal expansion is multiplied by the number of nozzles present and leads to the fact that the individual blocks lying plane-parallel to one another on account of their lateral fixation bend open and leak at the connection locations of the respective feed channels, or that the lateral retaining screws cannot withstand the increased mechanical loading.

SUMMARY OF THE INVENTION

It is therefore the object of the present invention to provide a hot-runner coinjection distributor block arrangement for injection moulding multi-layered mouldings and for a multitude of injection nozzles, with which differing material components which may comprise different melting and processing temperatures, may be treated without leakage and with low wear. This distributor block arrangement is to be maintenance friendly and thus formed inexpensively.

According to the invention this object is achieved by a distributor block arrangement according to claim 1, and in particular by a distributor block arrangement which consists of several block parts. These block parts are slidingly supported within a hot-runner plate and are mounted displaceably against one another. For this between the individual block parts there are provided sliding intermediate pieces and between the block part on the head plate side and the head plate there are incorporated movably mounted support elements, wherein between these support elements and the head plate there is provided at least one spring element which spaces the support element in the cold operating mode from the head plate. The distance produced by these spring elements permits a thermal expansion for the whole distributor block arrangement, without leading to unacceptable tension conditions. The closure force necessary for the sealing of the individual block parts or intermediate pieces is produced by this spring element independently of the respective operating temperature.

With this distributor block arrangement simultaneously 48 or more multi-layered mouldings of plastic may be manufactured, without at the same time there occuring leakage problems or premature occurrences of wear. In particular the thermal expansion which is increased many times by these highly equipped multiple tools may be accommodated and it may be avoided that the individual blocks lying plane-parallel to one another are bent open, or that their lateral retaining screws shear. Further advantageous features of the invention are deduced from the dependent claims or auxiliary claims.

In particular the individual block parts may be heated independently of one another and the intermediate pieces and support elements are manufactured from a poor heat-conducting material. Furthermore the intermediate pieces and support elements are provided with a peg-shaped projection in order to control and advantageously so influence the mutual positioning of the individual block parts that the bores for the needle of the needle closure system and the feed channels are not essentially displaced against one another under thermal loading.

BRIEF DESCRIPTION OF THE DRAWING

In the following the invention is described in more detail by way of one embodiment example and the FIGURE. There is shown.

DETAILED DESCRIPTION OF THE INVENTION

Figure 1:
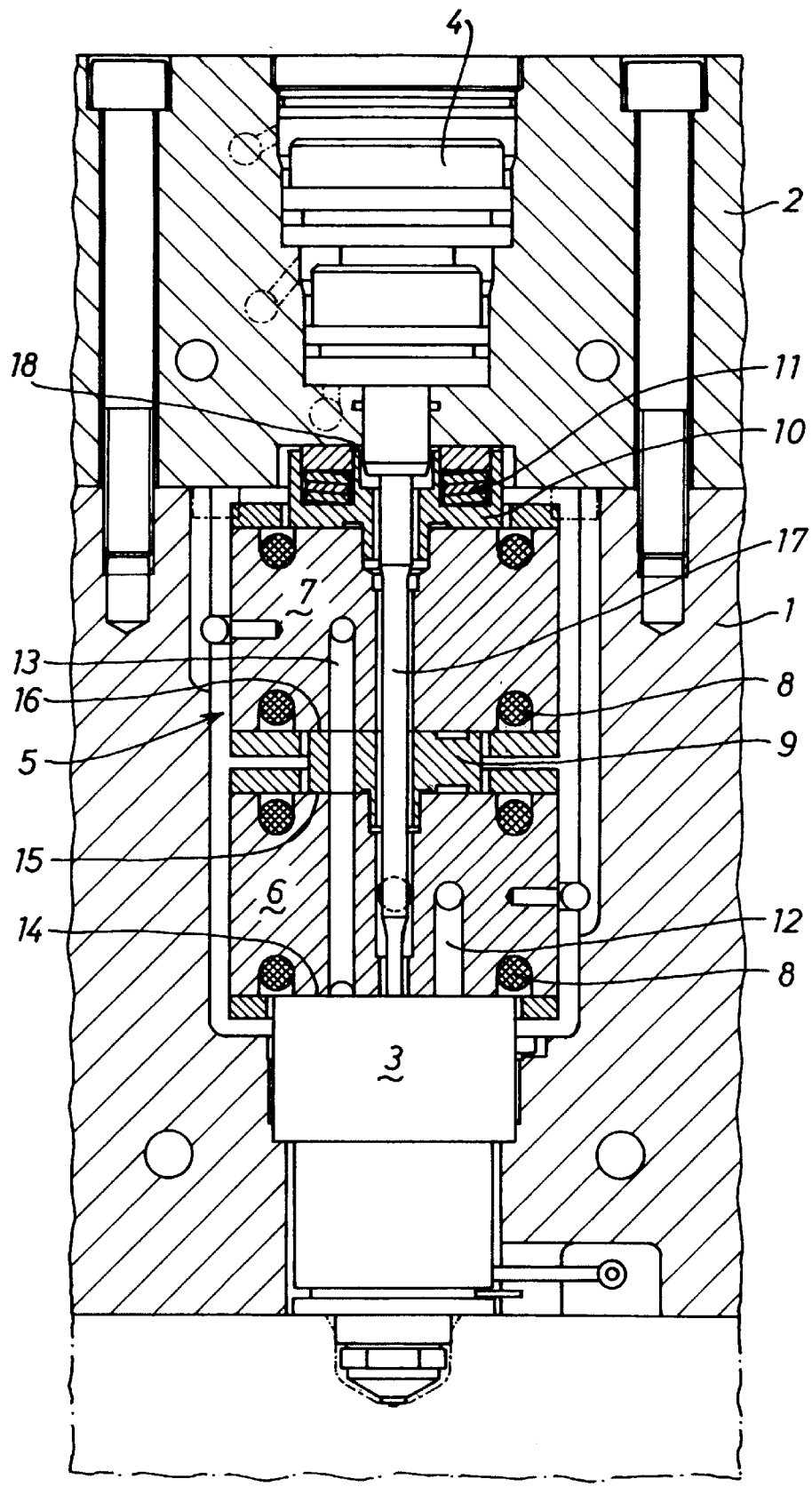
FIG. 1: a section through a hot-runner distributor block arrangement according to the invention.

From the cross section through the hot-runner plate 1 shown in FIG. 1, at the location of a hot-runner nozzle 3 closable with a needle valve 4 the construction according to the invention of the hot-runner block arrangement 5 can be seen. This arrangement comprises a block part 6 on the nozzle side and a block part 7 on the machine side. For the transport of various material components there are provided feed channels 12 and 13 in these block parts. With the manufacture of multi-layered mouldings, in particular such from PET (polyethylene terephtalate), which in the inside comprise a blocking layer of EVOH (ethylene vinyl hydroxide), the two block parts 6, 7 are maintained at the processing temperatures required for these plastic materials. With this, the block part 6 on the nozzle side for example carries the hotter material provided for the outer side of the moulding to be injected, and the block part 7 on the machine side carries the cooler material provided in the inside of the moulding to be manufactured. For the mentioned product of PET and EVOH the block part on the nozzle side must be maintained at approx. 280° C. and the block part on the machine side 7 has a temperature of approx. 200° C.

In order to be able to maintain a homogeneous as possible temperature distribution within the respective block part 6, 7 in a simple manner, these are spaced from one another with an intermediate piece 9. This intermediate piece is manufactured from a subject with a poor heat-conductability, for example of titanium or stainless steel. A support element 10 on the machine side, according to the invention comprises several spring elements, in particular disc springs and in the cold mode is spaced by a gap 18 of approx. 0.45 mm from a head plate 2. By way of these disc springs 11 it may be ensured that also in the cold mode the nozzles may be tensioned on the mould tool with the required contact pressure and on heating the distributor block arrangement 5 this contact pressure increases to maximum 3.5 tons per nozzle. This contact pressure produced by the disc springs 11 ensures that no leakages occur at a first abutting surface 14 between the hot-runner nozzle 3 and the block part 6 on the nozzle side, or a second abutting surface 15 between the block part 6 on the nozzle side and the intermediate piece 9, or a third abutting surface 16 between the intermediate piece 9 and the block part 7 on the machine side. By way of the thermal expansion of the two hot-runner block parts 6, 7 and of the intermediate piece 9, the distance between the support element 10 and the head plate 2 reduces and the support element only needs to accommodate and transmit a tension of approx. 0.5 tons, instead of 10 to 12 tons. The remaining tension is accommodated and transmitted by the disc spring 11.

The needle closure system 4 comprises two pistons arranged over one another with which the needle 17 can be brought into various positions. In the furthest pushed forward position the needle 17 completely closes the exit of the nozzle 3. In a first retracted position the needle 17 releases a first feed channel 12 and permits the material carried therein to flow into the mould space. In a second, further retracted position the needle 17 releases a second feed channel 13 and permits the material carried in this channel to get into the mould space. Such closure arrangements are essentially known and are not the subject-matter of the present invention.

In order with the present distributor block arrangement to be able to use such needle closure systems it must be ensured that the individual bores in which the needle 17 is guided are not mutually displaced with a differing thermal expansion. For this the intermediate piece 9 and the support element 10 according to the invention are provided with a peg-like projection which engages into corresponding recesses in the individual block parts 6, 7. With this it can be ensured that the individual block parts 6, 7, with a thermal loading, essentially displace axially to the needle 17 and the relative displacements transverse to the needle direction do not compromise the course of the bores.

This modular-like construction allows the individual block parts 6, 7, with heating elements 8, to be brought to different temperatures without, on account of this, there being produced material stresses which either lead to leakages or to damage of the distributor block arrangement. The thermally caused relative displacements are controlled by the peg-shaped projection of the intermediate piece 9 and of the support element 10.

Further formations of this distributor block arrangement according to the invention lie in the scope of the ability of the man skilled in the art. In particular for the manufacture of mouldings of three or more differing materials, several block parts may be arranged behind one another which in each case are separated from one another by intermediate pieces. The gap width between the support element and the head plate or the spring force of the spring element may be suitably dimensioned by the man skilled in the art.

What is claimed is:

1. A hot-runner coinjection distributor block arrangement comprising:

a multitude of hot-runner nozzles each of which can be closed with a needle of a needle closure system, said block arrangement further comprising:

a hot-runner plate releasably connected to a head plate, wherein between said plates at least two individual block parts are arranged, a first of said at least two block parts being disposed on a head plate side, and a second of said at least two block parts being disposed on a nozzle side;

an intermediate piece positioned between said at least two block parts through which said intermediate piece there is passed at least one feed channel and the needle; and wherein between the first block part on the head plate side and the head plate there is provided a support element arranged axial to the needle of each needle closure system, and further characterised in that the second block part on the nozzle side is slidingly supported on the hot-runner plate and the at least two block parts in the whole distributor block region are displaceable against one another;

wherein between said support element and the head plate there is provided at least one spring element which spaces the support element in a cold operating mode from the head plate by a gap width, said gap width corresponding to the thermal expansion of the whole distributor block arrangement in the needle direction in a hot operating mode, wherein said spring element is arranged and dimensioned to exert a contact pressure force which acts parallel to the needle direction and which, in the cold as well as in the hot operating mode, tightly closes abutting surfaces between the hot-runner nozzles and a mould cavity, or between the hot-runner nozzles and said second block part on the nozzle side, or between the at least two block parts and the respective intermediate piece, said spring element having a maximum spring travel stroke which corresponds to the gap width.

2. A distributor block arrangement according to claim 1, characterised in that the spring element is a disc spring.

3. A distributor block arrangement according to claim 1, characterised in that the spring element has a deflection of at least 0.4 mm and exerts a force of at least 2 tons.

4. A distributor block arrangement according to claim 1, wherein said at least two block parts comprises only two block parts.

5. A distributor block arrangement according to claim 4, characterised in that said at least two block parts can be heated independently of one another.

6. A distributor block arrangement according to claim 1, characterised in that the intermediate piece comprises a poor heat-conducting material.

7. A distributor block arrangement according to claim 6, characterised in that the intermediate piece further comprises a peg-shaped projection arranged axially symmetrically to the needle between the at least two block parts.

8. A distributor block arrangement according to claim 1, characterised in that the support element comprises a poor heat-conducting material.

9. A distributor block arrangement according to claim 8, characterised in that the support element further comprises a peg-shaped projection arranged axially symmetrically to the needle between said first of the at least two block parts and the head plate.

10. A distributor block arrangement according to claim 1, further comprising 48 or more hot-runner nozzles.

11. A distributor block arrangement according to claim 2, characterised in that the spring element has a deflection of at least 0.4 mm and exerts a force of at least 2 tons.

* * * * *